United States Patent [19]

Bays

[11] 4,008,784
[45] Feb. 22, 1977

[54] SEISMIC SIGNAL SOURCE
[75] Inventor: Marvin G. Bays, Houston, Tex.
[73] Assignee: Seiscom Delta Inc.
[22] Filed: June 12, 1975
[21] Appl. No.: 586,147
[52] U.S. Cl. ............................ 181/114; 181/119; 340/17 R
[51] Int. Cl.$^2$ .................................. G01V 1/14
[58] Field of Search ............. 181/114, 119; 340/17
[56] References Cited
UNITED STATES PATENTS
3,301,345  1/1967  Carder ........................... 181/114
3,718,206  2/1973  Babb et al. ..................... 181/114

Primary Examiner—Leland A. Sebastian
Attorney, Agent, or Firm—Pravel, Wilson & Gambrell

[57] ABSTRACT

A seismic signal source adaptable for use with various types of seismic exploration vehicles which move over land. A signal means forms a seismic signal, and a transfer means transfers the signal to a fluid-filled tire of the vehicle for improved and more efficient coupling of the signal to the ground surface. Whether the vehicle with which the source is mounted is stationary or moving, signals may be sent from the source into the ground.

21 Claims, 10 Drawing Figures

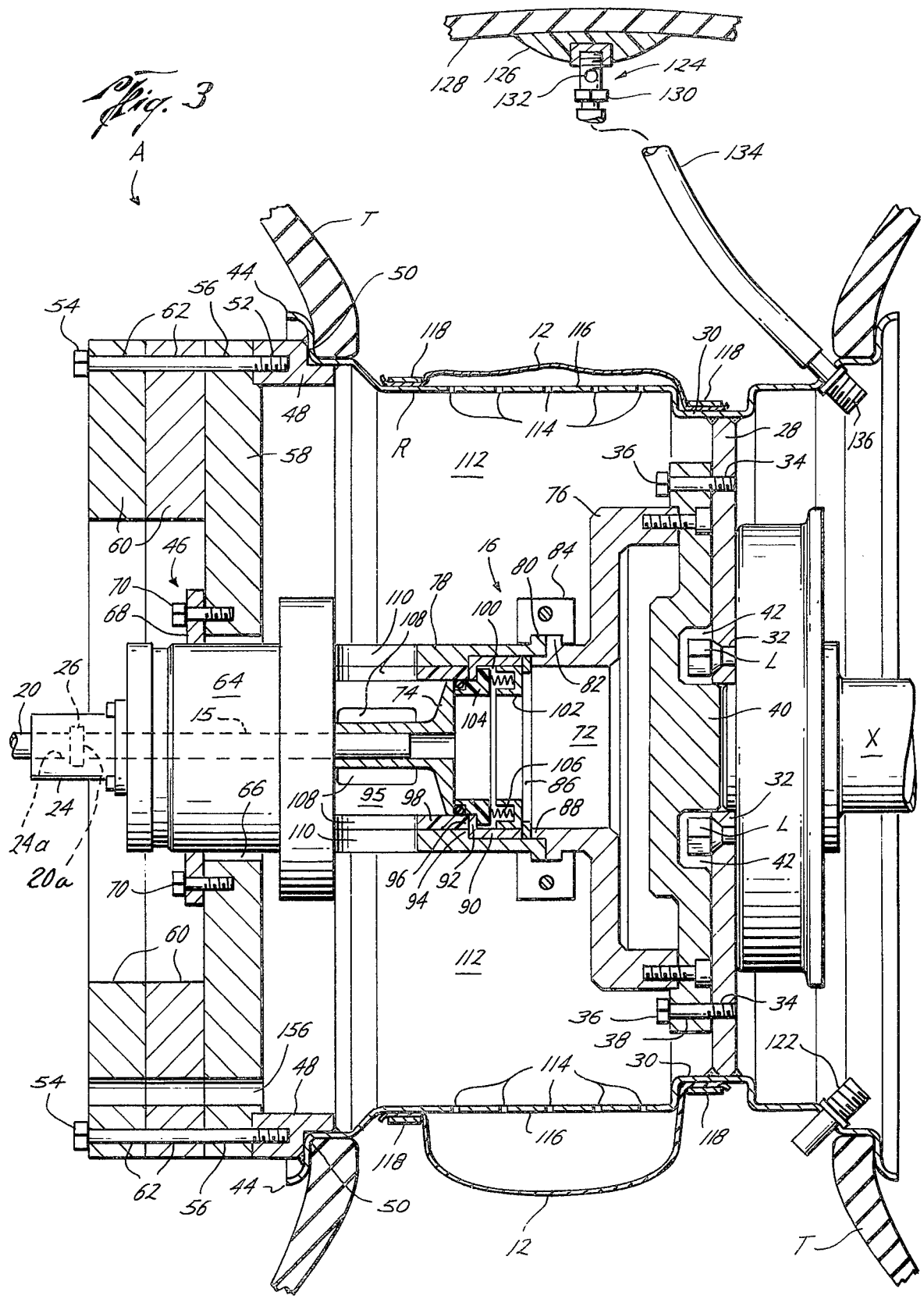

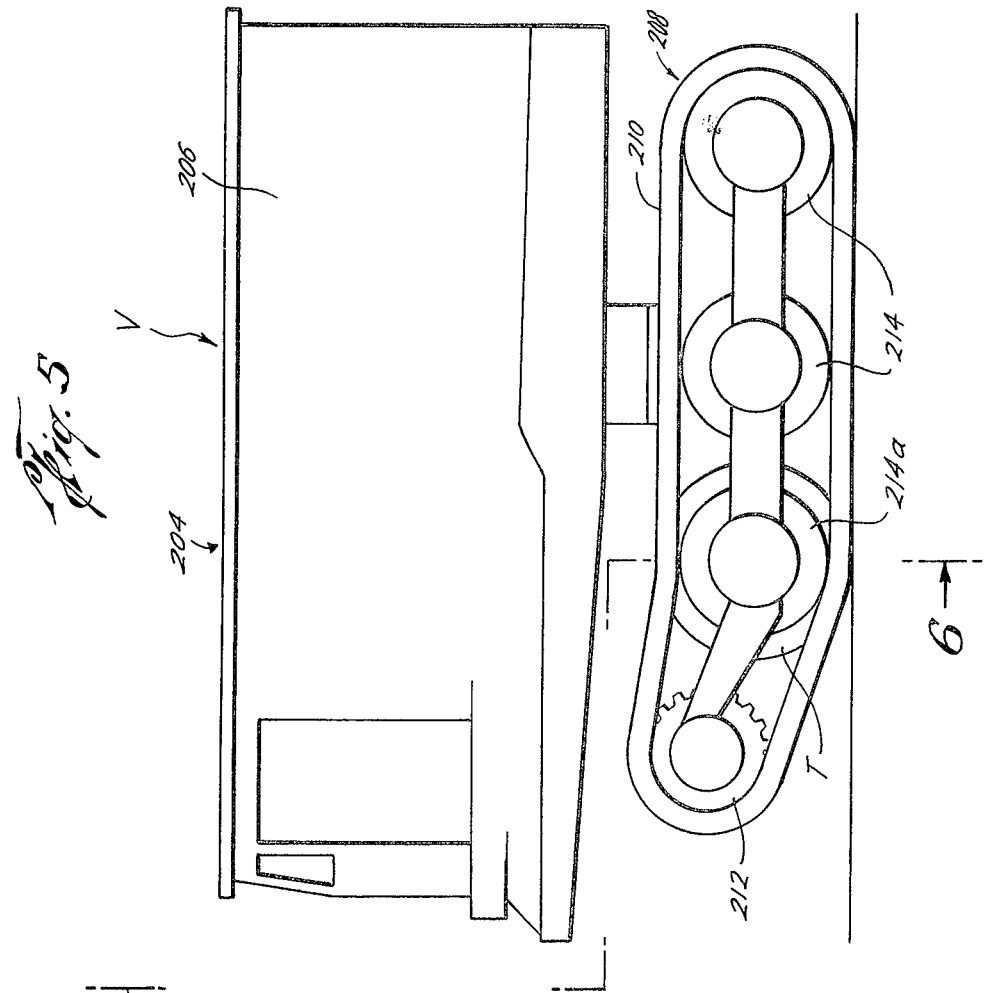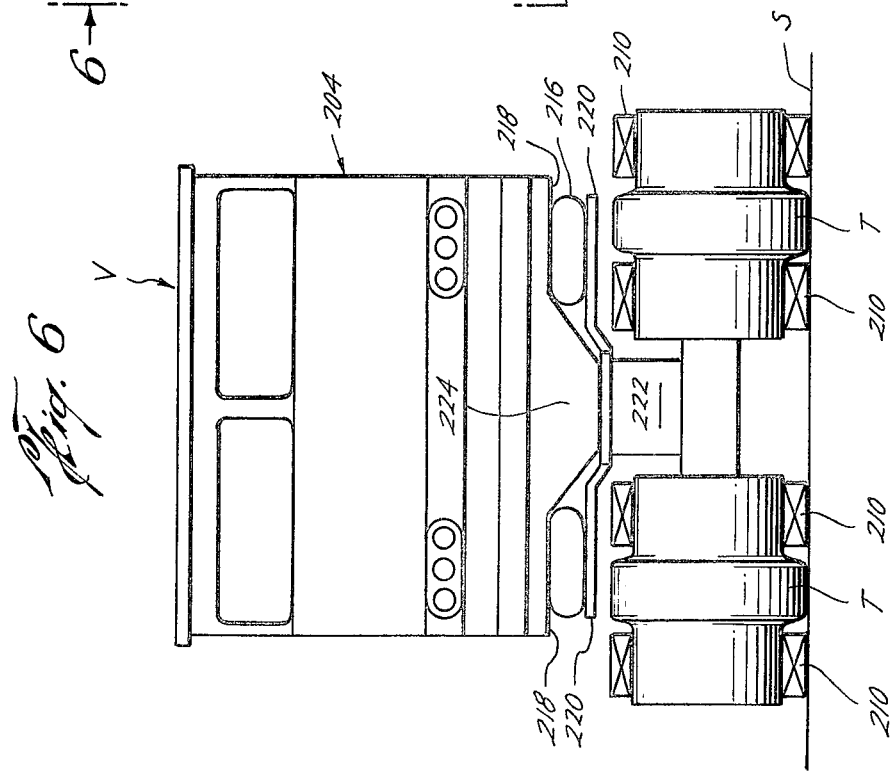

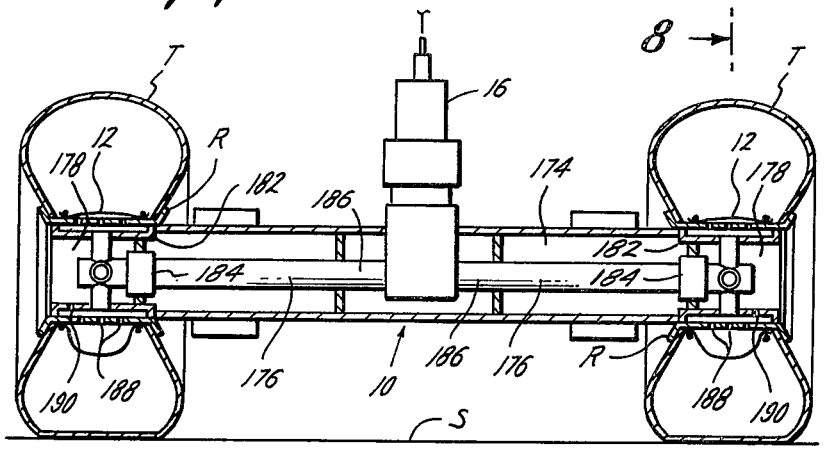
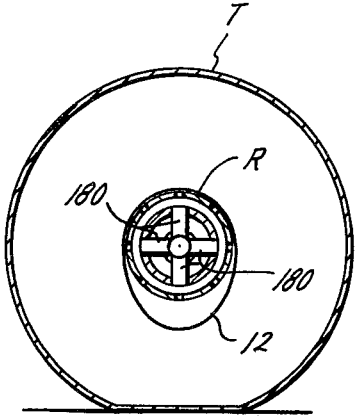
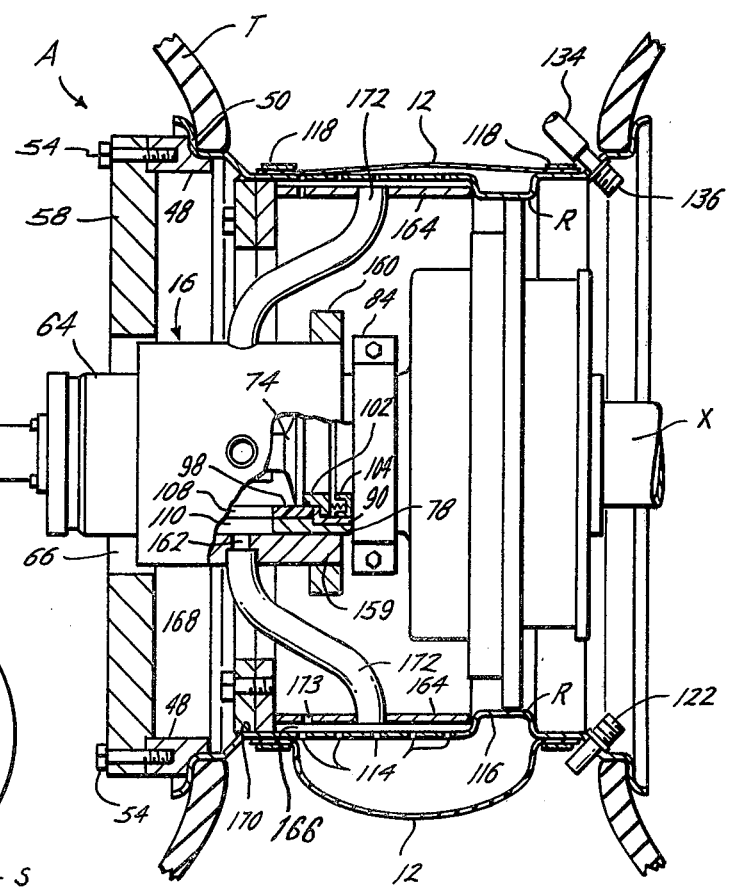

SEISMIC SIGNAL SOURCE

BACKGROUND OF THE INVENTION

1. FIELD OF THE INVENTION

The present invention relates to seismic sources.

2. DESCRIPTION OF THE PRIOR ART

Certain prior art seismic sources for geophysical or seismic exploration beneath land surfaces, such as that disclosed in U.S. Pat. No. 3,310,128, have been based on an attempt to adapt an air gun used in marine seismic surveying to land use. A large and cumbersome water-filled tank was mounted with a special form of truck bed to receive the air gun and couple the energy from the gun to the land surface at the seismic shot point or signal transmission point.

When the source was moved to a new shot point, the water tank was drained and raised from the ground, and the truck driven to a new shot point, making this exploration technique cumbersome, time consuming, and expensive.

Other apparatus, such as that disclosed in U.S. Pat. No. 3,435,410, mounted a "sparker" or electric spark discharge seismic source in partially liquid-filled tires for use as a seismic exploration source. A considerable portion of the energy from the sparker was consumed in compressing the air or gas remaining in the partiall liquid-filled tires. This was undesirable, due to the reduction in the energy output from the source.

SUMMARY OF THE INVENTION

It is an object of the present invention to provide a new and improved seismic signal source.

Briefly, the present invention provides a new and improved seismic signal source adaptable for use with various seismic exploration vehicles permitting quicker and more effective use of one or more seismic sources and providing improved coupling of the signal to the ground. Further, the structure of the present invention permits seismic exploration to take place while the vehicle is moving as well as when it is stationary.

In one form, the present invention provides an adapter for mounting with a land vehicle having fluid-filled tires. Seismic signals formed in the adapter are coupled through at least one of the fluid-filled tires to the ground for seismic exploration. A rim means mounts the tire with the vehicle, an annular cover means forms a chamber adjacent the rim means, and openings are formed in the rim means adjacent the chamber. A transfer means transfers the seismic signal to the chamber for coupling of the signal through the openings in the rim means to the fluid in the tire and to the land surface.

In another embodiment of the present invention, a fluid-filled tire is again mounted with the seismic exploration vehicle by a rim means. A plate means is mounted with the rim means to form a chamber in which a signal means for forming a seismic signal is mounted. Openings are formed in the rim means to convey the seismic signal from the signal means to the fluid-filled tire for coupling the signal to the land surface.

In another form of the present invention, the first and second flexibly coupled members are mounted between separate inner and outer portions of the rim means, and moved with respect to each other. This movement of the first and second members imparts vibrations to the fluid-filled tire for coupling the seismic signal vibration to the land surface.

In yet another embodiment of the present invention, the source is used with a tracked seismic exploration vehicle movable over land surfaces as the tracks are driven by drive wheels within the tracks. The vehicle and the tracks are supported by idler wheels in the tracks and a conduit means transfers a seismic signal to the idler wheels for coupling of the signal through the idler wheels to the land surface.

BRIEF DESCRIPTION OF THE DRAWINGS

FIG. 3 is a cross-sectional view illustrating portions of the subject matter of FIG. 2 in greater detail;

FIGS. 5 and 6 are elevation views of the front and side, respectively, of yet another embodiment of the present invention;

FIG. 7 is an elevation view, taken partly in cross-section, of another embodiment of the present invention;

FIG. 8 is a cross-sectional view taken along lines 8—8 of FIG. 7;

FIG. 9 is a cross-sectional view of yet another embodiment of the present invention; and FIG. 10 is a side plan view of a portion of the apparatus of the present invention.

DETAILED DESCRIPTION OF THE PREFERRED EMBODIMENTS

Figure 1:
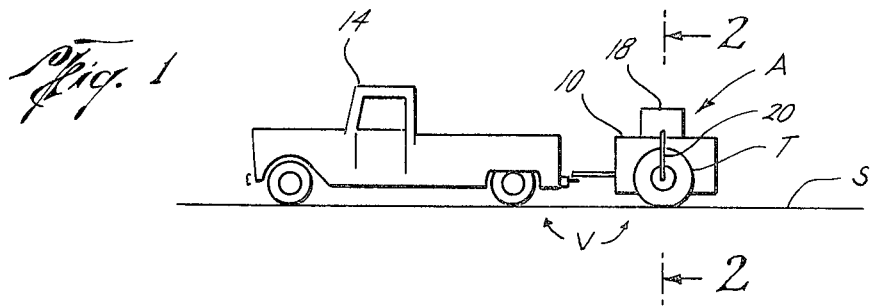
FIG. 1 is an elevation view of the apparatus of the present invention.

In the drawings, the letter A designates generally the apparatus of the present invention, an adapter for coupling seismic signals to a land surface S for seismic or geophysical exploration beneath the land surface. The apparatus A, which is mounted with a vehicle V movable over land surface S, includes signal producing means for forming a seismic signal. The signal from the signal producing means is coupled to a fluid-filled tire T or other similar structure and then to land surface S for seismic exploration of geological strata beneath the surface S.

In a first embodiment of the present invention (FIGS. 1–3), apparatus A is mounted with a trailer 10 which is drawn over the land surface S by a truck 14 or other towing vehicle. Trailer 10 rolls on tires T which are filled with water or other fluid having suitable signal transfer characteristics. Each tire T is mounted with a rim R which is affixed to a wheel drum W of an axle X (FIG. 2) of the trailer 10 so that trailer 10 is supported by tires T. Also mounted with rim R is a signal producing means such as an air gun 16 for producing a pressure wave seismic signal by rapid release of compressed gas. As explained in more detail hereinbelow, the pressure wave seismic signal from gun 16 is conveyed through rim R to a diaphragm 12. As the pressure wave encounters diaphragm 12, it causes the diaphragm to expand and accelerate fluid in a lower portion 13 of tire T toward land surface S. The accelerated fluid exerts a force on land surface S through tire T, thereby imparting the seismic signal to land surface S.

Figure 2:
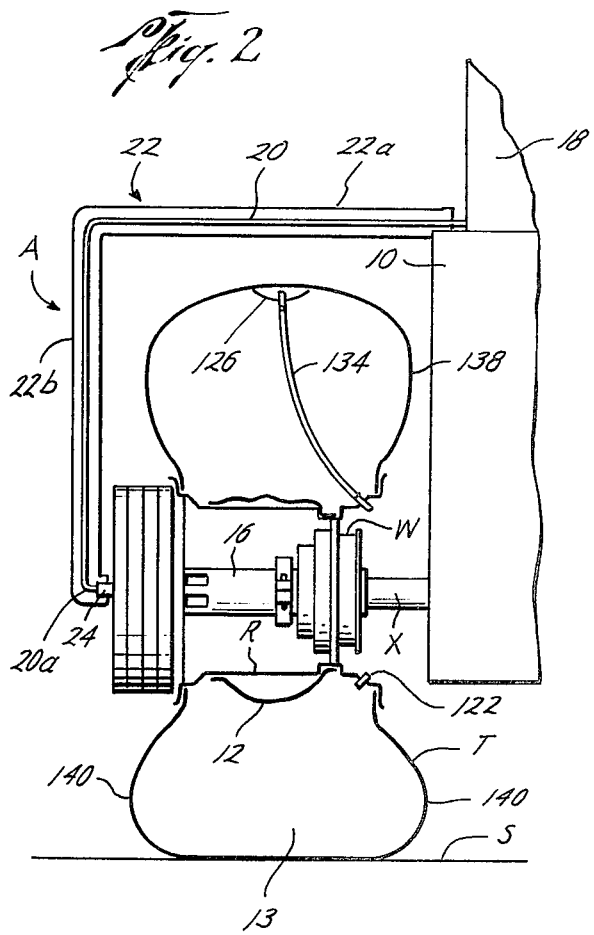
FIG. 2 is a cross-sectional view taken along the lines 2—2 of FIG. 1.

While various types of signal producing means may be used with the present invention, gun 16 illustrated in FIGS. 2 and 3 is a conventional pneumatic air gun, such as the type known in the art as the PAR air gun, a trademark of Bolt Associates, Inc. of Norwalk, Conn., adapted for mounting with the rim R of trailer 10. The gun 16, when connected to a suitable source of compressed air, forms, pressure waves of compressed air when actuated by an appropriate electrical control signal. These pressure waves constitute the seismic signal for apparatus A.

To provide a suitable air supply to gun 16, a compressor 18 is mounted in trailer 10 and connected to an inlet 15 (FIG. 3) of gun 16 by a conduit 20. Conduit 20 remains stationary with respect to trailer 10 as the trailer moves over land surface S, but inlet 15 rotates with tire T and rim R. To provide a suitable connection between a lower end 20a of conduit 20 and inlet 15 of gun 16, a socket 24 is provided. Sufficient clearance is maintained between the outer surface of conduit 20 and the inner surface of socket 24 to permit relative rotational movement between the two members. In addition, a swivel joint 26 or other suitable means provides a seal between conduit end 20a and socket 24. Further, a support plate 22 is mounted with trailer 10 to support conduit 20 in its stationary position. Horizontally extending arm 22a of support plate 22 is mounted directly to trailer 10, and downwardly extending arm 22b of plate 22 is mounted between arm 22a and socket 24. By this structure, gun 16 is provided with a continuous source of compressed air from compressor 18 even as the tire T and rim R rotate with respect to trailer 10.

To minimize any strain which might be placed on the air supply structure due to movement of gun 16 with respect to trailer 10 and to counter forces which might jar gun 16 loose or otherwise cause the gun to malfunction, it is desirable that gun 16 and rim R be securely mounted with wheel drum W of the trailer 10. However, it is also desirable that any structure mounting gun 16 and rim R to wheel drum W permits easy installation or removal of the gun 16 and rim R so that initial installation and subsequent maintenance and repair can be readily accomplished. Apparatus A includes structure which provides the apparatus with both these desirable features.

Rim R is mounted with wheel drum W of trailer 10 by a cylindrical mounting plate 28 (FIG. 3). The mounting plate 28 is welded or otherwise suitably attached to an interior surface 30 of rim R. A plurality of openings 32 are formed in plate 28 to permit insertion of wheel lugs L through plate 28 to rigidly mount plate 28 and rim R to the wheel drum W.

Gun 16 is mounted with rim R. Cylindrical mounting plate 28 is formed with a plurality of threaded bores 34 to receive a corresponding number of bolts 36. The bolts 36 extend through slots 38 through a gun end plate 40 which is rigidly affixed to gun 16. With the bolts 36 tightly secured in bores 34, end plate 40 and hence gun 16 are rigidly mounted with mounting plate 28 and rim R. A plurality of recesses 42 are formed in end plate 40 to provide clearance for wheel lugs L when plate 34 is in this mounted position. At a side 44 of the rim R opposite wheel drum W, the gun 16 is supported by rim R through a mounting means indicated generally by numeral 46. A mounting member 48 is welded or otherwise suitably affixed to an outer portion 50 of rim R. Member 48 is formed with a plurality of threaded bores 52 to receive a corresponding number of bolts 54. The bolts 54 extend through slots 56 formed in an outer mounting plate 58. As explained in more detail below, when it is desired to increase the coupling of the seismic signal to land surface S, mounting plate 58 may be formed of a heavy material to add weight to apparatus A and abutting weight rings 60 having slots 62 aligned with the slots 56 in plate 58 may also be provided. Bolts 54 extend through slots 62 and 56 to rigidly mount plate 58 and the weight rings 60 with rim R. An outer housing 64 of gun 16 extends through an opening 66 in outer mounting plate 58, but housing 64 is mounted with the plate by an annular flange 68 which is bolted to plate 58 by plurality of bolts 70.

As can be understood from the above description, gun 16 is rigidly secured to rim R. However, the mounting structure described permits easy installation or removal of the gun for initial installation and subsequent maintenance and repair. For example, to remove gun 16 from its mounted position, bolts 70 and 54 are removed so that plate 58 and rings 60 can be removed. Then upon removal of bolts 36, the entire gun 16 is disengaged from rim R. There is no need to dismantle the entire wheel structure of trailer 10.

In its mounted position, gun 16 forms pressure wave seismic signals which are coupled through fluid in tire T to land surfaces. The gun includes an inner chamber 72, a sliding piston 74, and an actuating solenoid (FIG. 3). The actuating solenoid is not illustrated but is positioned within housing 64. With piston 74 in the position illustrated in FIG. 3, chamber 72 is an air tight cavity in which pressurized air from compressor 18 is accumulated. However, when gun 16 is fired, a control signal is supplied to the actuating solenoid which slides piston 74 very rapidly toward housing 64, causing a rapid release of the pressurized air chamber 72 and thereby creating a gaseous pressure wave.

As shown in the detailed illustration in FIG. 3, a side chamber member 76 is bolted to end wall 40 to form a portion of the wall of chamber 72. An outer sleeve 78 has a shoulder 80 which abuts a shoulder 82 of chamber member 76, and a ring clamp 84 joins the two members securely together.

The remainder of the elements of gun 16 which form chamber 72 are mounted with member 76 and sleeve 78. An annular stop 86 is mounted between lip 88 of chamber member 76 and retaining ring 90. The inwardly extending shoulder 92 of retaining ring 90 is held firmly against a shoulder 94 of outer sleeve 78 as well as an end 96 of an inner sleeve 98. Lateral movement of either stop 86 or retaining ring 90 is prevented by chamber member 76 and outer sleeve 78.

The retaining ring 90 and stop 86 form a recess 100 for mounting a first sealing member 102 and a second sealing member 104. A resilient means such as spring 106 extending into engagement with both sealing members 102 and 104 forces the second sealing member 104 into constant, firm engagement with shoulder 92 of retaining ring 90 to aid in forming an air tight seal at the interface of member 104, retaining ring 90, and inner sleeve 98. A sealing ring 106 is also provided to form an air tight seal with piston 74, second sealing member 104, and inner sleeve 98 when piston 74 engages sealing member 104.

As previously noted, pressurized air is accumulated in chamber 72 prior to the firing of gun 16. When the gun is fired, piston 74 slides toward housing 64 along inner sleeve 98 to form a pressure wave. Preferably, the inner sleeve 78 is formed of synthetic resin or other suitable material to reduce friction between the piston 74 and the sleeve 98.

Immediately after gun 16 is fired, the pressure wave caused by the firing of the gun propagates down cavity 95 of inner sleeve 98 and through a plurality of ports 108 formed in inner sleeve 98. Preferably, ports 108 are four in number and are spaced about the circumference of sleeve 98 at equal intervals. A second set of ports 110 is formed in outer sleeve 98 and aligned with ports 108 to permit the pressure wave to pass into a cavity 112 formed by gun 16 and rim R. From cavity 112, the pressure wave travels through a plurality of openings 114 in rim R and on to diaphragm 12.

Diaphragm 12 is securely mounted on an outer surface 116 of rim R by a pair of clamps 118 or other suitable mounting means and forms a fluid tight seal between cavity 112 and the fluid in tire T. The diaphragm is made of any suitable material having elastic properties. As the gaseous pressure wave from gun 16 contacts the diaphragm 12, the diaphragm expands in a radial direction and accelerates fluid in tire T, thereby converting the pressure wave from an acceleration of gases to an acceleration of fluid in tire T without aerating the fluid in tire T. The pressure wave then propagates through the fluid in tire T to the tread portion 120 of the tire in contact with land surface S to couple the pressure wave to the land surface.

This coupling of the pressure wave to land surface S is accomplished very efficiently by apparatus A. Energy losses during the propagation of the pressure wave from gun 16 to land surface S are minimized by providing a relatively incompressible wave propagation media in tire T so that little, if any, wave energy is diverted to compressing the media through which the wave travels.

Apparatus A includes structure by which tire T is filled with a relatively incompressible fluid and by which air is expelled from the tire. Fluid is introduced into tire T through a suitable inlet port such as valve stem 122. The fluid may be water, hydraulic fluid, or other suitable fluids. For cold weather or artic operations, a suitable anti-freeze solution may also be placed in tire T. As the fluid is forced onto tire T the volume of the water displaces and compresses the air already in the tire. This air is expelled from tire T through an exhaust member 124. Exhaust member 124 includes a base 126 which is vulcanized or otherwise suitably affixed to an inner surface 128 of tire T opposite the tread of the tire. A housing member 130 is mounted with base 126. The housing member includes an exhaust port 132 which communicates with exhaust tube 134. The exhaust tube 134, in turn, communicates with an outlet port 136. Exhaust port 132, exhaust tube 134, and outlet port 136 form a passageway by which air is expelled from tire T to the atmosphere exterior to the tire. A bleeder valve (not shown) may be provided in outlet port 136 to control the direction of the air flow through exhaust member 124.

Fluid is forced into tire T until substantially all the air in the tire has been expelled through exhaust member 124 and only the relatively incompressible fluid remains within the tire. This fluid serves as a relatively incompressible pressure wave propagation media in the tire for efficient use of the pressure wave energy. If tire T were filled with air or another compressible substance, some of the energy of the pressure wave would be wasted in compressing that compressible substance as the wave propagated through tire T. However, since the tire T of apparatus A is filled with an incompressible fluid, little, if any, of the pressure wave energy is wasted in compressing the media through which the wave propagates.

Efficient use of the pressure wave energy is also enhanced by minimizing the amount of the fluid in the tire T which is accelerated as the pressure wave propagates through the tire. With the structure of apparatus A, only a portion of the fluid in tire T, that in the lower portion 13 of the tire, is substantially accelerated as the pressure wave is coupled to land surface S.

This localized acceleration occurs principally because the volume of fluid placed in tire T is less than that required to extend the tire to its fully inflated shape. That is, tire T has a given interior volume when fully inflated, but the volume of fluid forced into tire T is less than that fully inflated interior volume. As a result, when tire T is mounted with trailer 10, the upper portion 138 of tire T is fully extended, but the lower sides 140 extend laterally (FIG. 2). Because of this underinflation of tire T, diaphragm 12 does not expand uniformly in response to the pressure wave from gun 16, although the diaphragm 12 is annular and extends completely around surface 116 of rim R. Since the upper portion 138 of tire T is fully extended and the lower portion 140 is not fully extended, the principal expansion of diaphragm 12 in response to the pressure wave occurs in the lower portion 13 of tire T where the tire is not fully extended. As a result, most of the energy from the pressure wave is used to accelerate only that fluid in the lower portion 13 of tire T, and this localized acceleration results in an efficient transfer of the pressure wave from gun 16 to land surface S because less of the pressure wave energy is used to accelerate the media through which the wave propagates.

As the gaseous pressure wave from gun 16 encounters diaphragm 12, the diaphragm in the lower portion 13 of tire T expands and accelerates a mass of fluid downwardly. The volume flow of fluid flows downwardly and accelerates the mass of trailer 10 in an upward direction while an equal and opposite force accelerates downwardly the portion of land surface S in contact with tire T. The force impulse on land surface S generates an acoustic energy wave which travels down through the land surface S. If desired, weight rings 60 (FIG. 3) may be provided with rim R of trailer 10 to provide added weight to the trailer and thereby make it possible to provide a force impulse of greater magnitude to land surface S.

As illustrated in FIG. 10, if a pressure wave of sufficient magnitude is provided through tire T, the tire is accelerated upwardly and moves out of contact with land surface S. If the movement of the tire were not controlled, the tire would re-engage land surface S due to gravity forces and transmit a second energy wave through the land surface S a very short time after the first energy wave. This second energy wave is undesirable because it would interfere with the proper detection of the reflections of the first energy wave from the geological substrata beneath land surface S. To reduce the magnitude of this second energy wave and to provide a time delay between the first and second energy wave, a shock assembly 142 such as that shown in FIG. 10 may be provided with apparatus A. The shock absorber assembly includes a mounting member 144 rotatably mounted with rim R. A first shaft 146 extends vertically downward from mounting member 144, and a second shaft 148 extends toward land surface S at an angle with reference to shaft 146. A small wheel 150 is mounted at an end 152 of shaft 148. A pneumatic cylinder 154 or other suitable means is connected between shaft 146 and 148. Shaft 148 is free to pivot about mounting member 144 as tire T moves vertically, but shaft 146 remains stationary in its downwardly extending position. The cylinder 154 attached between shafts 146 and 148 exerts a force on shaft 148 in the direction indicated by the arrow in FIG. 10. As tire T is accelerated upwardly and moves out of contact with land surface S, cylinder 154 exerts a force on shaft 148 and maintains wheel 150 in contact with land surface S. As tire T begins its downward descent, cylinder 154 resists clockwise movement of the shaft 148 and thereby provides an upward force on tire T. This upward force partially counters the gravitational forces on the tire assembly, and reduces the impact with which the tire T re-engages land surface S. In addition, the upward force slows the fall of tire T to provide a time delay before the tire T re-engages land surface S. In this way, the second energy wave transmitted to land surface S because of the re-engagement of tire T with the land surface is both minimized on magnitude and delayed in time.

Apparatus A is constructed so that seismic signals may be repetitively coupled to land surface S as the tire T moves over the land surface. Subsequent to the coupling of the pressure wave from gun 16 to the land surface S, the air emitted from gun 16 is bled off to the atmosphere external to the assembly A. An exhaust passage 156 is provided through plate 158 and weight rings 60 to allow air to escape from the apparatus A subsequent to each firing of gun 16. Upon the firing of gun 16, only minimal amounts of air pass through exhaust passage 156 because the openings 114 and rim R are more numerous and larger in size so that they provide less initial flow resistance to the air than does exhaust passage 156. However, subsequent to the expansion of diaphragm 12, pressure within the apparatus A tends to equalize with the outside atmospheric pressure and air flows back through openings 114 and out passage 156. The relative sizes of openings 114 and passageway 156 may be varied to determine the time it will take to bleed cavity 112 of excess air pressure so that the firing rate of apparatus A may be controlled.

FIG. 9 illustrates an alternative embodiment of apparatus A which may be used with a trailer as shown in FIG. 1. The apparatus illustrated in FIG. 9 is similar in many respects to that illustrated in FIGS. 1 and 2. Accordingly, like reference numerals have been used to illustrate corresponding parts in the two embodiments.

The apparatus shown in FIG. 9 includes structure which even further enhances the efficiency with which the pressure wave from gun 16 is coupled to land surface S through tire T. A manifold sleeve 159 is provided around a portion of gun 16 and mounted to the gun with a ring clamp 160. Manifold 159 has a plurality of bores 162 which are aligned with ports 108 and 110 in sleeves 78 and 98 respectively. An annular manifold 164 is also provided with the apparatus A. Manifold 164 is mounted adjacent an inner surface 166 of rim R by a two part rim flange 168. Rim flange 168 is mounted with rim R at an inner surface 170 of the rim by welding or other suitable means. A spider conduit 172 connects each of the bores 162 in manifold sleeve 159 with the inner surface 166 of rim R. Thus, when gun 16 is fired, the pressure wave from the gun propagates through ports 108 and 110, through bore 162, spider conduits 172, manifold 164, and to the inner surface 166 of rim R. At the inner surface 166 of rim R the pressure wave passes through openings 114 in the rim and on to diaphragm 12 where the gaseous pressure wave from gun 16 is converted to a fluid acceleration wave and coupled through the fluid in tire T to land surface S. Subsequent to the coupling of the seismic signal to land surface S, the air between diaphgram 12 and surface 116 of rim R passes through openings 114 and an exhaust opening 173 in manifold 164. The exhausting air then is vented to the outside atmosphere through the opening 66 in plate 58. As was the case with the apparatus illustrated in FIG. 3, exhaust opening 173 offers significantly more initial flow resistance to the pressure wave from gun 16 than do the openings 114 in rim R. Therefore, substantially all of the pressure wave from gun 16 first travels through openings 114 in rim R rather than through the exhaust opening 173 in manifold 164.

One of the significant advantages of the apparatus illustrated in FIG. 9 is that the amount of air which is compressed during the propagation of the pressure wave from gun 16 to the diaphragm 12 is substantially reduced. By directing the propagation path of the pressure wave through the spider conduits 172, the effective volume of air through which the pressure wave travels is minimized. Therefore, less of the energy in the pressure wave from gun 16 is dissipated in compression of the media through which it travels. A greater portion of the pressure wave energy is, therefore, left to be imparted to ground surface S.

FIGS. 7 and 8 illustrate yet another embodiment of the present invention which may be used with a trailer 10 to simultaneously impart seismic signals from two or more tires T to land surface S. Gun 16 is mounted within bed 174 of trailer 10, and a pair of conduit means 176 is provided to form a propagation path for the pressure wave from gun 16 to the tires T. At the ends 178 of each of the conduits 176, a plurality of tubular connectors 180 provide a communication between conduits 176 and an annular manifold 182. Preferably, there are four tubular conduits 180 spaced 90L apart. The annular manifold 182 is mounted with rim R of the tires T by welding or other suitable means. A swivel connection 184 is provided in conduit 176 so that the ends 178 of conduit 176 may rotate with rim R as does manifold 182 while the inner portions 186 of conduits 176 remain stationary with respect to trailer bed 174.

The operation of each of the tire units in the embodiment of apparatus A illustrated in FIGS. 7 and 8 is quite similar to that of the apparatus illustrated in FIG. 9. Gun 16 is fired and produces a pressure wave which propagates through conduits 176 and tubular members 180 to a plurality of openings 188 in rim R. The pressure wave passes through openings 188 in rim R and contacts diaphragm 12 which expands to transduce the pressure wave into a fluid acceleration wave so that the pressure wave is transmitted through tire T to land surface S. The force impulse from the tires T generates an acoustic energy wave which travels through land surface S to the substrata beneath the surface. After the seismic signal has been transferred to land surface S, the air between diaphragm 12 and rim R passes back through openings 188 in rim R and through an exhaust orifice 190 in annular manifold 182. From the orifice 190 the air passes to the outside atmosphere, and the apparatus A is then ready to be fired again.

A principal advantage of the apparatus illustrated in FIGS. 7 and 8 is that a single gun 16 is used to impart two or more seismic signals to land surface S simultaneously. Synchronization of the signals presents no problem with the structure described because the single source 16 is used to generate all of the seismic signals.

Figure 4:
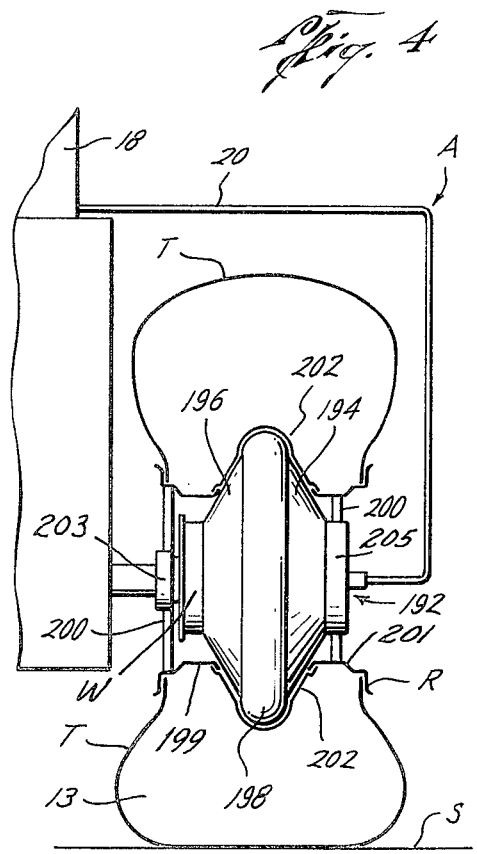
FIG. 4 is a cross-sectional view of another embodiment of the present invention.

The embodiments of apparatus A previously described have each employed a signal producing means which generates a gaseous pressure wave. However, other signal producing means may be used with apparatus A. One such embodiment is illustrated in FIG. 4 where a source 192 which produces a swept frequency signal is employed as the signal producing means. Because the source is known in the art, it is illustrated only generally in FIG. 4. The source consists principally of two conically shaped members 194 and 196 joined by a flexible intermediate member 198. The flexible member 198 permits a controlled lateral vibratory movement of members 194 and 196 with respect to each other so that a swept frequency seismic signal may be generated. To facilitate vibratory movememt of conical members 194 and 196, rim R consists of an inner member 199 and a separate outer member 201. Vibratory members 194 and 196 are not rigidly mounted with the rim sections 199, 201; rather, arms 200 mount the rim sections 199, 201 to stationary members 203 and 205 of the vibrator and members 203 and 205 to wheel drum W. A thin sealing membrane 202 forms a water tight seal at the interface of the vibrator elements and the fluid in tire T. With this structure, the vibratory seismic signal is imparted to the fluid in the lower portion 13 of tire T and coupled with land surface S. Thus, swept frequency vibratory signals are imparted to the land surface S for exploration of the geological substrata beneath the surface.

Yet another embodiment of the present invention is illustrated in FIGS. 5 and 6. According to this embodiment, apparatus A is installed in a tracked vehicle 204. The tracked vehicle illustrated includes a cab 206 and a track drive means 208. A pair of tracks 210 is provided at each side of the vehicle, and a drive wheel 212 is positioned within each of the tracks to move the tracks and thereby move the vehicle 204. In addition, a plurality of idler wheels 214 are provided to support track 210 and cab 206. Apparatus A is mounted in one of the idler wheels 214a. Idler 214a serves a similar function as does rim R described in the previous embodiments of the present invention. Fluid-filled tire T is mounted with idler wheel 214a. As illustrated in FIG. 6, apparatus A may be mounted with two or more of the idler wheels in vehicle 204 to couple a plurality of seismic signals to land surface S. The specific structure of any of the embodiments of the present invention described above may be incorporated with the tracked vehicle embodiment of the present invention. For example, FIG. 6 shows generally the apparatus illustrated in FIGS. 7 and 8 adapted to tracked vehicle 204.

Since personnel ride in cab 206 of vehicle 204, shock absorber means illustrated in FIG. 6 may be employed to cushion the shock to the cab when the seismic signal is coupled to land surface S. Air or fluid-filled cushions 216 are provided on opposing sides of an lower portion 218 of cab 206, and the cushions 216 are supported by horizontally extending support members 220. In addition, a heavy duty shock absorbing cylinder may be positoned within frame member 222 so that the central lower portion 224 of the cab 206 may move vertically with respect to frame member 222. With this structure, the shock to cab 206 of the tracked vehicle 204 is cushioned so that the personnel operating vehicle 204 will not be unduly jolted as the seismic signal is imparted to land surface S.

As with the other embodiments previously described, the tracked vehicle embodiment of the present invention permits repetitive coupling of seismic signals to the land surface S. The signals may be imparted to the land surface S while vehicle 204 is moving, and the use of a tracked vehicle provides the added traction attendant to tracked vehicles so that explorations may be conducted in rugged regions.

Each of the embodiments of apparatus A provides significant advances over known land seismic signal sources. Apparatus A is easy to operate and highly mobile. The signal producing means is actuated by an electrical control signal from the vehicle which is movable over land. The signal producing means provides a seismic signal which is very efficiently coupled through a fluid-filled tire T to the land surface S. With some embodiments, a plurality of signals are imparted to the land surface S without synchronization problems. With each of the embodiments, successive shots are not only easily implemented, but the shots may be fired as the vehicle V is moving over land.

The foregoing disclosure and description of the invention are illustrative and explanatory thereof, and various changes in the size, shape, and materials as well as in the details of the illustrated construction may be made without departing from the spirit of the invention.

I claim:

1. In a tracked seismic exploration vehicle movable over land surfaces in response to tracks of such vehicle being driven by a drive wheel in the tracks with the vehicle and tracks supported by idler wheels in the tracks, the improvements comprising:
   a. signal means for forming a seismic signal in a compressible medium, said signal means mounted with the tracked seismic exploration vehicle; and
   b. conduit means mounted with the tracked seismic exploration vehicle for transferring the compressible medium seismic signal from said signal means to a substantially non-compressible fluid within a fluid-filled tire mounted with at least one of the idler wheels for coupling the seismic signal from said signal means through said idler wheel and said fluid-filled tire to the land surface.

2. The structure of claim 1, wherein said conduit means comprises:
   means for transferring the seismic signal to plural idler wheels having plural fluid-filled tires therewith for coupling the signal through each of said plural idler wheels and said plural fluid-filled tires to the land surface.

3. The structure of claim 1, wherein the vehicle is equipped with a cab further including:
   shock absorber means for protecting the cab of the vehicle from shock and vibrations due to the transfer of the seismic signal to the land surface.

4. An adapter for coupling seismic signals to a fluid-filled land vehicle tire for seismic exploration beneath land surfaces, comprising:
   a. rim means for mounting the fluid-filled land vehicle tire with an axle of the vehicle;
   b. annular cover means for forming a chamber adjacent said rim means for receiving the seismic signal;

c. said rim means having openings formed therein in communication with said chamber; and d. means for transferring the seismic signal to said chamber for coupling the seismic signal with said chamber to communicate the seismic signal through said chamber to communicate the seismic signal through said openings in said rim means to the fluid-filled tire on the land surface for coupling the seismic signal to the land surface.

5. The structure of claim 4, further including:

weight means mounted with said rim means for increasing the effectiveness of signal coupling between the vehicle tire and the land surface.

6. The structure of claim 4, further including:

signal means mounted with the vehicle for forming a pressure wave seismic signal.

7. The structure of claim 6, wherein:

said signal means comprises a pneumatic air gun.

8. The structure of claim 6, wherein:

said signal means comprises a swept frequency vibratory seismic signal source.

9. The structure of claim 6, wherein the pressure wave seismic signal is a gaseous pressure wave, and further including:

diaphragm means mounted with said rim means internally of the tire and externally of said rim means, said diaphragm means coupling the gaseous pressure wave to the fluid in the tire while preventing aeration of such fluid.

10. The structure of claim 6, wherein:

a. said signal means is mounted with said rim means; and b. said means for transferring comprises plural conduits extending between said signal means and said annular cover means for conveying the pressure wave signal therebetween.

11. The structure of claim 10, further including:

means mounted externally of the vehicle tire for actuating said signal means.

12. The structure of claim 4, further including:

exhaust means for venting said chamber between said rim means and said annular cover means.

13. The structure of claim 4, further including:

means for venting air from the vehicle tire while the tire is being filled with fluid.

14. An adapter for coupling seismic signal to a fluid-filled land vehicle tire for exploration beneath land surfaces, comprising:

a. rim means for mounting the tire with an axle of the vehicle;

b. plate means mounted with said rim means for forming a chamber within said rim means;

c. signal means for forming a seismic signal;

d. said signal means being mounted in said chamber; and e. said rim means having openings formed therein adjacent said chamber for conveying the seismic signal from said source means to the fluid filled tire for coupling therethrough to the land surface.

15. The structure of claim 14, further including:

weight means mounted with said rim means for increasing the effectiveness of signal coupling between the vehicle tire and the land surface.

16. The structure of claim 14, wherein:

said signal means comprises a pneumatic air gun.

17. The structure of claim 14, wherein the pressure wave seismic signal is a gaseous pressure wave and further including:

diaphragm means mounted with said rim means internally of the tire for coupling the gaseous pressure wave to the fluid in the tire while preventing aeration of such fluid.

18. The structure of claim 14, further including:

exhaust means for venting said chamber.

19. The structure of claim 14, further including:

means mounted externally of the vehicle tire for actuating said signal means.

20. The structure of claim 14, further including:

means for venting air from the vehicle tire while the vehicle tire is being filled with fluid.

21. A wheeled vehicle mounted seismic signal source for forming seismic exploration signals for exploration beneath land surfaces, comprising:

a. a fluid-filled tire;

b. a wheel rim adapted to receive said fluid-filled tire, said wheel rim comprising:

1. an inner portion adapted for mounting with a wheel drum exterior on an axle of the wheeled vehicle;

2. an outer portion separate from said inner portion; and c. source means for forming a seismic signal, said source means comprising:

1. a first member mounted with said inner rim;

2. a second member mounted with said outer rim;

3. means for flexibly coupling said first member and said second member to permit relative movement therebetween;

4. means for moving said first member and second member with respect to each other wherein such movements impart vibrations to the fluid-filled tire for coupling to the land surface.

* * * * *